(12) United States Patent
Sekiya

(10) Patent No.: US 8,417,579 B2
(45) Date of Patent: Apr. 9, 2013

(54) METHOD OF MANAGING PARTS

(75) Inventor: Kazuma Sekiya, Ota-Ku (JP)

(73) Assignee: Disco Corporation, Tokyo (JP)

( * ) Notice: Subject to any disclaimer, the term of this patent is extended or adjusted under 35 U.S.C. 154(b) by 20 days.

(21) Appl. No.: 13/192,929

(22) Filed: Jul. 28, 2011

(65) Prior Publication Data

US 2012/0047047 A1 Feb. 23, 2012

(30) Foreign Application Priority Data

Aug. 18, 2010 (JP) .................. 2010-182713

(51) Int. Cl.
*G06Q 30/00* (2012.01)

(52) U.S. Cl.
USPC ........................ 705/26.1; 705/27.1

(58) Field of Classification Search .............. 705/26, 705/27
See application file for complete search history.

(56) References Cited

U.S. PATENT DOCUMENTS 4,845,646 A * 7/1989 Marquis et al. ............... 702/162
8,271,521 B2 * 9/2012 Vadon et al. .................. 707/770

FOREIGN PATENT DOCUMENTS

| JP | 2005-153090 | 6/2005 |
| JP | 2006-156809 | 6/2006 |

OTHER PUBLICATIONS

Diamonds, by Gary Thatcher, The Christian Science Monitor [Boston, Mass] May 14, 1981, downloaded from ProquestDirect on the Internet on Jan. 30, 2013, 4 pages.*

* cited by examiner

*Primary Examiner* — James Zurita
(74) *Attorney, Agent, or Firm* — Greer, Burns & Crain, Ltd.

(57) ABSTRACT

A method of managing a plurality of parts of an apparatus includes creating a part database of part information including at least the weights, part numbers, and shapes of individual parts, measuring the weight of a part to be ordered, entering the measured weight through input means of an information terminal and accessing the part database, extracting part information of all parts having weights which fall in a predetermined allowable range similar to the entered weight, from the part database, and displaying the extracted part information on display means of the information terminal, identifying the part number of the part to be ordered based on shapes of the parts represented by the displayed part information, and ordering the part with the identified part number.

2 Claims, 5 Drawing Sheets

20

| PART NUMBER | SHAPE | WEIGHT | PRODUCT INFORMATION | NAME |
|---|---|---|---|---|
| A0001 | △ | 500g | 5x5x10 | BRACKET |
| A0002 | ○ | 450g | 5x5x8 | SPACER |
| A0003 | + | 600g | PITCH 1 | BOLT |
| A0004 | ◎ | 300g | PITCH 1 | NUT |
| A0005 | ± | 200g | 10mm | SCREW |
| B0001 | w | 350g | NA0.5 | OBJECTIVE LENS |
| B0002 | u | 660g | MANUFACTURED BY NIKON | MICROSCOPE |
| B0003 | Ω | 250g | 50W | ELECTRIC BULB |
| B0004 | = | 400g | 5x5x10 | LENS CASE |
| B0005 | ¥ | 550g | MANUFACTURED BY OLYMPUS | CAMERA |
| B0006 | H | 200g | 5x2 | LENS COVER |
| C0001 | § | 200g | MADE OF VINYL | TUBE |
| C0002 | ¶ | 800g | 5x5 | CONNECTOR |

FIG. 2

| PART NUMBER | SHAPE | WEIGHT | PRODUCT INFORMATION | NAME |
|---|---|---|---|---|
| A0001 | △ | 500g | 5x5x10 | BRACKET |
| A0002 | ○ | 450g | 5x5x8 | SPACER |
| A0003 | + | 600g | PITCH 1 | BOLT |
| A0004 | ◎ | 300g | PITCH 1 | NUT |
| A0005 | ‡ | 200g | 10mm | SCREW |
| B0001 | ψ | 350g | NA0.5 | OBJECTIVE LENS |
| B0002 | ∪ | 660g | MANUFACTURED BY NIKON | MICROSCOPE |
| B0003 | Ω | 250g | 50W | ELECTRIC BULB |
| B0004 | ≡ | 400g | 5x5x10 | LENS CASE |
| B0005 | 末 | 550g | MANUFACTURED BY OLYMPUS | CAMERA |
| B0006 | H | 200g | 5x2 | LENS COVER |
| C0001 | § | 200g | MADE OF VINYL | TUBE |
| C0002 | ∥ | 800g | 5x5 | CONNECTOR |

FIG. 5

| WEIGHT | NAME | SHAPE | PRODUCT INFORMATION | PART NUMBER |
|---|---|---|---|---|
| 200g | SCREW | + | 10mm | A0005 |
| 200g | LENS COVER | H | 5x2 | B0006 |
| 200g | TUBE | s | MADE OF VINYL | C0001 |
| | | | | |

28

METHOD OF MANAGING PARTS

BACKGROUND OF THE INVENTION

1. Field of the Invention

The present invention relates to a method of managing parts which are to be ordered.

2. Description of the Related Art

Semiconductor devices such as ICs, LSI circuits, or the like are formed in areas defined by division lines on a device wafer. After the reverse side of the device wafer is ground to a predetermined thickness by a grinding apparatus, the device wafer is divided into the semiconductor devices by a dividing apparatus such as a dicing apparatus or the like. The divided semiconductor devices will be used in a wide range of electric appliances including mobile phones, personal computers, etc.

The grinding apparatus includes a number of mechanisms including a chuck table for holding a device wafer, a grinding unit having a grinding wheel for grinding the device wafer held by the chuck table, a cassette placing region for placing therein a cassette which houses a plurality of wafers, a wafer unloading mechanism for unloading a wafer from the cassette placed in the cassette placing region, a temporary holding table for temporarily holding and positioning a wafer thereon, a wafer loading mechanism for loading a wafer from the temporary holding table onto the chuck table, a thickness detecting mechanism for detecting the thickness of a wafer, a wafer unloading mechanism for unloading a ground wafer from the chuck table, and a spinner cleaning mechanism for cleaning an unloaded wafer. Each of the mechanisms is made up of a plurality of parts including bolts, nuts, and brackets. For detail, reference should be made to Japanese Patent Laid-Open No. 2005-153090, for example.

The dicing apparatus includes a number of mechanisms including a chuck table for holding a device wafer, a feed mechanism for feeding a wafer, a cutting unit having a cutting blade for cutting a wafer, and a spinner cleaning device for cleaning a cut wafer. Each of the mechanisms is made up of a plurality of parts. For detail, reference should be made to Japanese Patent Laid-Open No. 2006-156809, for example.

SUMMARY OF THE INVENTION

When any of parts of mechanisms of machining apparatus including a grinding apparatus and a dicing apparatus is broken, it has to be replaced with a new one ordered from the apparatus manufacturer or the like. However, it is often hard for the machining apparatus user to find the part number of the damaged part, and hence it is a tedious and time-consuming task to order a new part to replace the damaged part. Therefore, the apparatus with the damaged part needs to be kept idle for a long time, resulting in poor productivity due to long downtime.

It is an object of the present invention to provide a method of managing parts in a way which makes it possible to order a necessary part with ease.

In accordance with an aspect of the present invention, there is provided a method of managing a plurality of parts of an apparatus, including creating a part database of part information including at least the weights, part numbers, and shapes of individual parts, measuring the weight of a part to be ordered, entering the measured weight through input means of an information terminal and accessing the part database, extracting part information of all parts having weights which fall in a predetermined allowable range similar to the entered weight, from the part database, and displaying the extracted part information on display means of the information terminal, identifying the part number of the part to be ordered based on shapes of the parts represented by the displayed part information, and ordering the part with the identified part number.

According to the present invention, the part database of the part information including at least the weights, part numbers, and shapes of individual parts is generated. When the apparatus user enters the weight of a necessary part, i.e., a part to be ordered, through the input means and accesses the part database, the display means displays all parts whose weights are classified into a weight range similar to the entered weight, together with their weights, shapes, part numbers, etc. By checking the displayed shapes of the parts, the apparatus user can easily identify the part number of the part to be ordered. Therefore, the apparatus user can place an order for the necessary part with the manufacturer or the like. The method of managing parts according to the present invention allows the apparatus user to order a necessary part quickly with ease, does not keep the apparatus with a damaged part idle for a long time, and hence increases the productivity of the apparatus.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 2 is a diagram showing a part information table by way of example;

FIG. 5 is a diagram illustrative of an extracted part information display step.

DETAILED DESCRIPTION OF THE PREFERRED EMBODIMENTS

Figure 1:
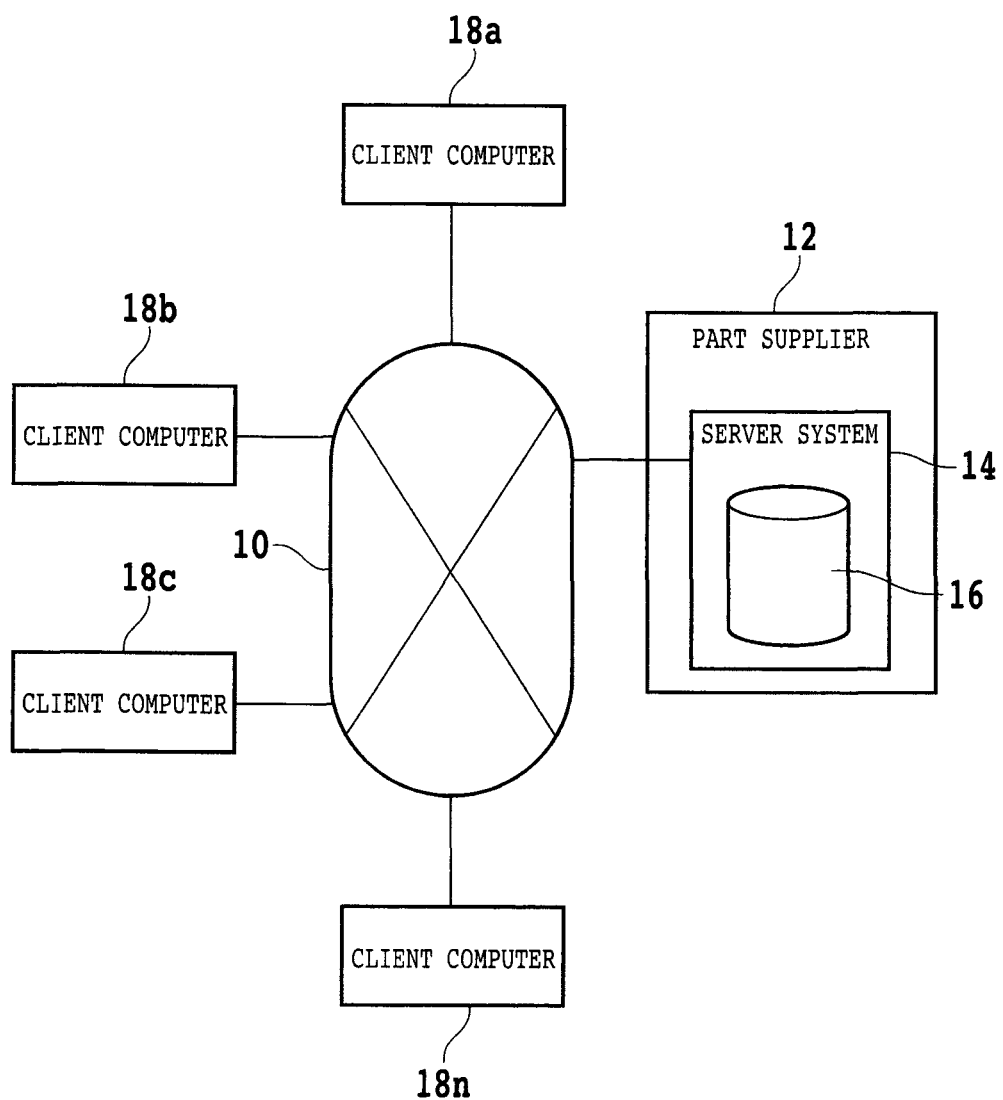
FIG. 1 is a block diagram of a system which carries out a method of managing parts according to an embodiment of the present invention.

A method of managing parts according to an embodiment of the present invention will be described in detail below with reference to the drawings. FIG. 1 shows system which carries out a method of managing parts according to an embodiment of the present invention. As shown in FIG. 1, the system includes a server system 14 belonging to a part supplier 12 such as a manufacturer of a machining apparatus such as a grinding apparatus or a dicing apparatus, and a plurality of client computers 18a, 18b, 18c, . . . , 18n installed in a factory of a machining apparatus user. The server system 14 is connected to the client computers 18a, 18b, 18c, . . . , 18n by the Internet 10. In FIG. 1, the server system 14 is shown as being installed in the premises of the part supplier 12. Instead, however, the part supplier 12 may use the server of an Internet service provider which the part supplier 12 has made a contract with, as the server system 14, and may upload its own homepage into the server system 14.

In the method of managing parts according to the present embodiment, a part information table 20 shown in FIG. 2 which includes at least the weights, part numbers, and shapes of individual parts is generated, and stored in a memory of the server system 14, producing a part database 16. The part information table 20 shown in FIG. 2 also includes product information and names of the parts, in addition to the weights, part numbers, and shapes of the parts.

Figure 3:
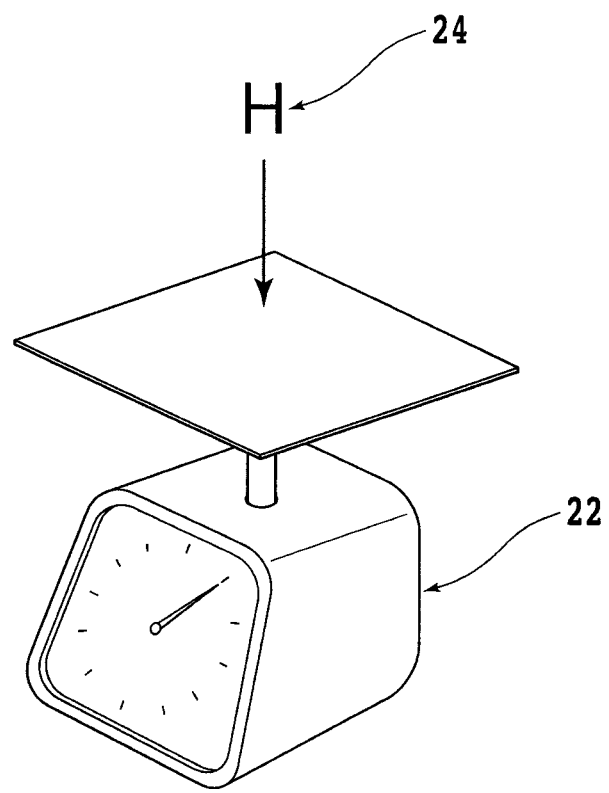
FIG. 3 is a perspective view illustrative of a weight measuring step.
Figure 4:
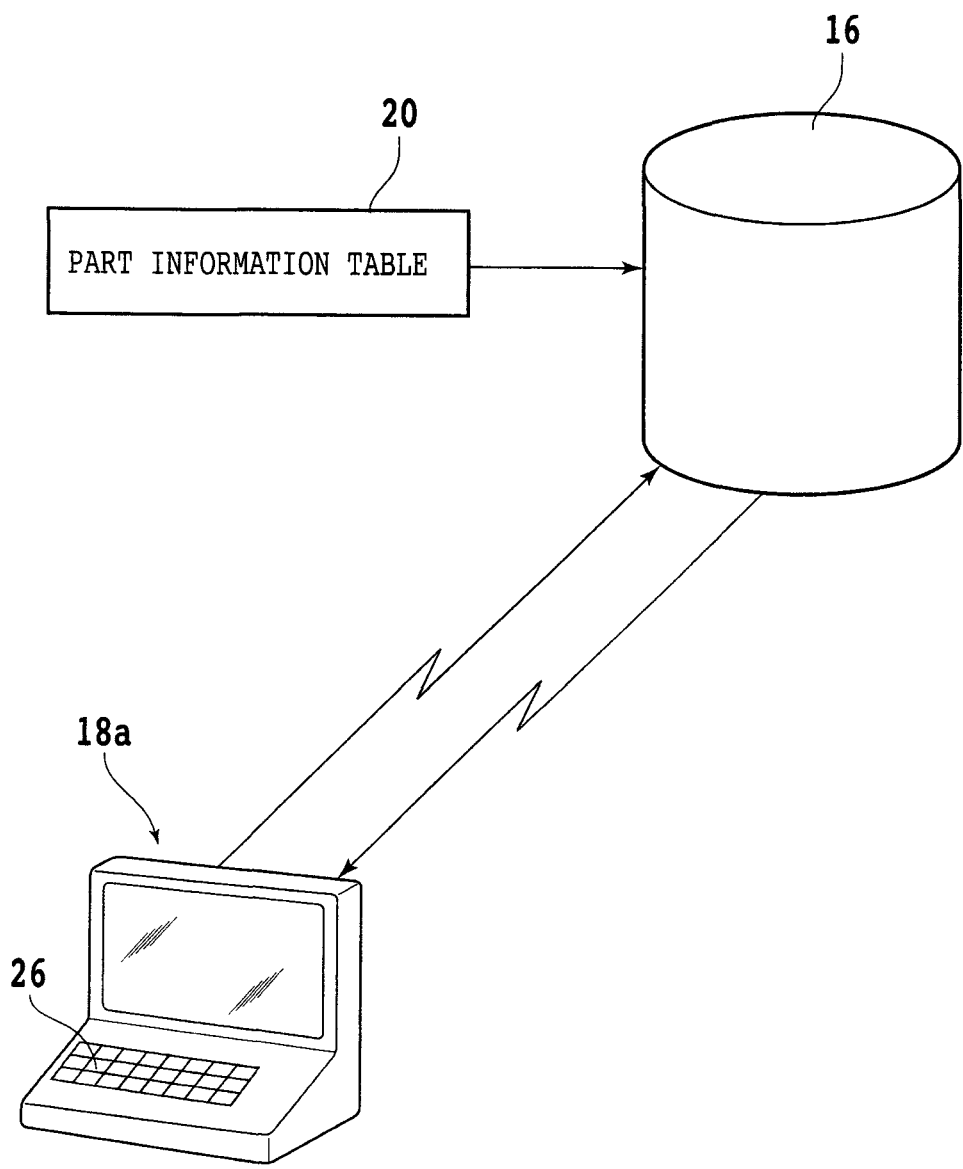
FIG. 4 is a perspective view illustrative of a weight input step.

When a part of a mechanism of the machining apparatus which is used by the machining apparatus user is broken, the machining apparatus user removes the broken part, and measures the weight of the broken part, i.e., a part to be ordered, which is denoted by 24 in FIG. 3, with a weight measuring device (scale) 22. It is assumed that the part 24 to be ordered weighs 200 g, for example. When the machining apparatus user finds the weight of the part 24 to be ordered, the machining apparatus user enters the weight of the part 24 to be ordered through input means such as a keyboard 26 (see FIG. 4) of the client computer 18a, for example, and accesses the part database 16 of the server system 14 via the Internet 10.

The server system 14 extracts the part information of all parts having weights which fall in a predetermined allowable range similar to the entered weight, from the part database 16, and sends the extracted part information via the Internet 10 to the client computer 18a, which displays the part information as an extracted part information table 28 (see FIG. 5) on its display means. The extracted part information table 28 includes the part information of all parts whose weights are close to 200 g. The machining apparatus user sees the displayed extracted part information table 28, and selects a part having a shape "H," displayed in the extracted part information table 28, which is identical to the shape of the damaged part 24, and identifies the part number of the part to be ordered as "B0006." Then, the machining apparatus user (ordering party) clicks on the part number "B0006" in the displayed extracted part information table 28 to order the necessary part.

According to the present embodiment, the part database 16 of the part information including at least the weights, part numbers, and shapes of individual parts is created. When the machining apparatus user enters the weight of a necessary part, i.e., a part to be ordered, through the input means and accesses the part database 16, the display means displays all parts whose weights are classified into a weight range similar to the entered weight, together with their weights, shapes, part numbers, etc. By checking the displayed shapes of the parts, the machining apparatus user can easily identify the part number of the part to be ordered. Therefore, the machining apparatus user can place an order for the necessary part with the manufacturer or the like. The method of managing parts according to the present embodiment allows the machining apparatus user to order a necessary part quickly with ease, does not keep the machining apparatus with a damaged part idle for a long time, and hence increases the productivity of the machining apparatus.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of managing a plurality of different parts constituting a machining apparatus, comprising:
    using a computer device having a computer processor to execute the following steps:
    creating a part database of part information including at least the weights, part numbers, and shapes of individual parts in the machining apparatus;
    measuring the weight of an existing part from the machining apparatus to be ordered by placing the existing part on a weighing scale;
    entering the measured weight into the computer device and accessing the part database;
    extracting part information of all parts having weights which fall in a predetermined allowable range similar to the entered weight, from said part database, and displaying the extracted part information;
    identifying the part number of a replacement part to be ordered based on shapes of the parts represented by the displayed part information; and
    ordering the replacement part with the identified part number.

2. The method according to claim 1, wherein the part with the identified part number is ordered by accessing the part database via the Internet.

\* \* \* \* \*